United States Patent
Wiacek et al.

(10) Patent No.: US 6,810,944 B2
(45) Date of Patent: Nov. 2, 2004

(54) SOLDERING OF SADDLES TO LOW EXPANSION ALLOY HEAT PIPES

(75) Inventors: Chris R. Wiacek, Northridge, CA (US); Hiroo H. Mahtani, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 43 days.

(21) Appl. No.: 10/354,306

(22) Filed: Jan. 30, 2003

(65) Prior Publication Data

US 2004/0149421 A1 Aug. 5, 2004

(51) Int. Cl.[7] ................................................. B60H 3/00
(52) U.S. Cl. ............... 165/41; 165/104.26; 165/104.21; 361/700; 174/15.2
(58) Field of Search .............................. 165/41, 104.26, 165/104.21, 104.33; 361/700; 257/715; 114/15.2

(56) References Cited

U.S. PATENT DOCUMENTS

| | | | |
|---|---|---|---|
| 4,170,262 A | | 10/1979 | Marcus et al. |
| 4,420,035 A | * | 12/1983 | Hewitt .................... 165/273 |
| 4,852,645 A | * | 8/1989 | Coulon et al. ............... 165/180 |
| 4,880,052 A | * | 11/1989 | Meyer et al. ........... 165/104.14 |
| 4,921,041 A | * | 5/1990 | Akachi ................... 165/104.29 |
| 4,934,160 A | * | 6/1990 | Mueller ....................... 62/515 |
| 4,966,226 A | | 10/1990 | Hamburgen |
| 5,697,428 A | * | 12/1997 | Akachi ................... 165/104.21 |
| 5,931,418 A | | 8/1999 | Eller et al. |
| 6,005,771 A | | 12/1999 | Bjorndahl et al. |
| 6,065,529 A | | 5/2000 | Antoniuk et al. |
| 6,080,962 A | | 6/2000 | Lee |

* cited by examiner

Primary Examiner—Terrell McKinnon
(74) Attorney, Agent, or Firm—Tarolli, Sundheim, Covell & Tummino L.L.P.

(57) ABSTRACT

A heat pipe structure is provided for facilitating temperature stability of heat generating devices residing in a spacecraft. The heat generating structure comprises wall tubing made of a low thermal expansion alloy and a low thermal expansion saddle joined together and embedded into composite panel face sheets or face skins with minimal to no coefficient of thermal expansion (CTE) mismatch. The saddle to composite radiating panel interface employs an adhesive as the joining material. The saddle to heat pipe interface is joined together employing a higher conductivity joining media, such as tin-lead solder, which improves the thermal performance of the heat pipe assembly and minimize the temperature drop across the interface.

26 Claims, 3 Drawing Sheets

SOLDERING OF SADDLES TO LOW EXPANSION ALLOY HEAT PIPES

This invention was made with Government support under Contract No.TMC96-5835-0094-03 awarded by the United States Air Force. The Government has certain rights in this invention.

TECHNICAL FIELD

The present invention relates generally to cooling of operating devices on spacecraft, and more particularly to a heat pipe structure with low expansion alloy heat pipes.

BACKGROUND OF THE INVENTION

Orbiting spacecrafts carry various devices (e.g., electronic devices) that generate unwanted heat during operation of the spacecraft. Additionally, the spacecrafts are subjected to intense environmental conditions that exasperate problems caused by the unwanted heat. Typically, the unwanted heat is removed by cooling devices referred to as heat pipe assemblies. Heat pipe assemblies transfer heat by conduction to one or more heat pipes which then convects the removed heat to radiating panels. In certain heat pipe designs, the radiating panels distribute the heat across the panel to maintain a uniform temperature across the radiating panels to provide isothermal control. In other heat pipe designs, the radiating panels extend outside the orbiting spacecraft such that the heat is radiated into ambient space. Variable conductive heat pipes vary the amount of conductivity, so that the heat remains generally constant.

In practice, the heat generating device is affixed to or within a heat pipe assembly having a heat absorbing host structure equipped with radiating panels and having at least one heat pipe embedded therein. The heat from the heat generating device vaporizes a working fluid in the heat pipe which is then condensed and the heat of the condensation conducted to the radiating panels. The embedded heat pipe removes heat from the heat generating device at its evaporator end and the vapors are condensed at its condenser end. The heat pipe assemblies can be fabricated using similar material for the host structure and the heat pipe to avoid problems caused by components having a different coefficient of thermal expansion (CTE) that could cause stress failures in the assembly. Limiting material selection is a compromise that affects the efficiency performance of the heat pipe, contributes to the weight of the spacecraft and is less optimum in terms of heat removal.

Current spacecraft design requires the use of lightweight materials possessing near-zero CTE such as composites in order to meet the reduced weight, thermal management, and precision pointing requirements. Composite radiator panels with embedded aluminum heat pipes lead to thermally induced stresses due to the dissimilar CTE of the aluminum and composites facesheets. This causes detachment or debonding of the aluminum heat pipe from the composite panel and/or fracture of the composite facings leading to failure of the thermal control system. Therefore, it is desirable to limit the use of materials with dissimilar thermal expansion coefficients and at the same time meet the preferred thermal and structural requirements of spacecraft construction that lend themselves to easy assembly and fabrication.

Thermal performance efficiency of a heat pipe panel is determined by how effective the heat is transferred from the heat source to the heat pipe inner wall. For a conventional extruded aluminum heat pipe, the heat has to travel through the panel skin, across the skin/heat pipe interface, and through the heat pipe extrusion wall to the working fluid, which provides the cooling. This is an efficient design, however, countless efforts have been made to accommodate aluminum heat pipes in composite panels with minimal success. The CTE mismatch between the aluminum and the composite skin is large (e.g., greater than 10 times) and during normal operation, this CTE difference has caused unwanted joint failure and/or panel skin failure. Design sacrifices have been made to provide a more flexible composite panel to support the CTE mismatch of these materials.

Previous industry attempts have been made to construct a lightweight heat pipe radiator utilizing an organic matrix composite tube with an aluminum lined foil. However, the shortcomings to this approach are the poor through thermal conductance in the radial direction of the heat pipe that limits heat transfer, as well as the thermal stresses between the thin aluminum liner and the organic matrix composite tube. Prior art, such as "The Embedded Heat Pipe Structure", U.S. Pat. No. 6,065,529, assigned to TRW, Inc., provided a heat pipe assembly formed of dissimilar CTE materials for the heat pipe and the panel structure by inserting a thermally expandable fluid between the aluminum heat pipe and the composite panel structure. However, a major shortcoming to this arrangement includes a difficult, different, and cost ineffective assembly process to the conventional heat pipe assembly procedures.

BRIEF SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to a heat pipe structure for facilitating temperature stability of heat generating devices residing in a spacecraft. The heat pipe structure comprises tubing made of a low thermal expansion alloy (e.g., Invar) and a low thermal expansion saddle (e.g., carbon-carbon) joined together and embedded into composite panel skins with minimal to no CTE mismatch. The saddle to composite facesheet interface can employ the common approach of using adhesive as the joining material. However, the saddle to heat pipe interface is joined together by using a higher conductivity joining media, such as tin-lead solder, which improves the thermal performance of the heat pipe assembly and minimize the temperature drop across the interface.

The heat pipes and the joining interfaces can be plated to facilitate the joining of the saddle to the heat pipes, for example, by soldering. The increase of the thermal heat transfer capability across the heat pipe/saddle interface optimizes the performance of the heat pipe assembly at the saddle/pipe interface. Typical interface media tends to possess low thermal conductivity, thus, lowering thermal performance or the ability to transfer heat from the heat source to the heat pipe. Soldering the saddle to the heat pipe provides a substantially higher thermal conductivity joining material with over a 50 times improvement in thermal transfer properties across this interface compared to the conventional adhesive bond approach. Additionally, the interface is stronger and more robust than conventional adhesive bonding.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

Figure 1:
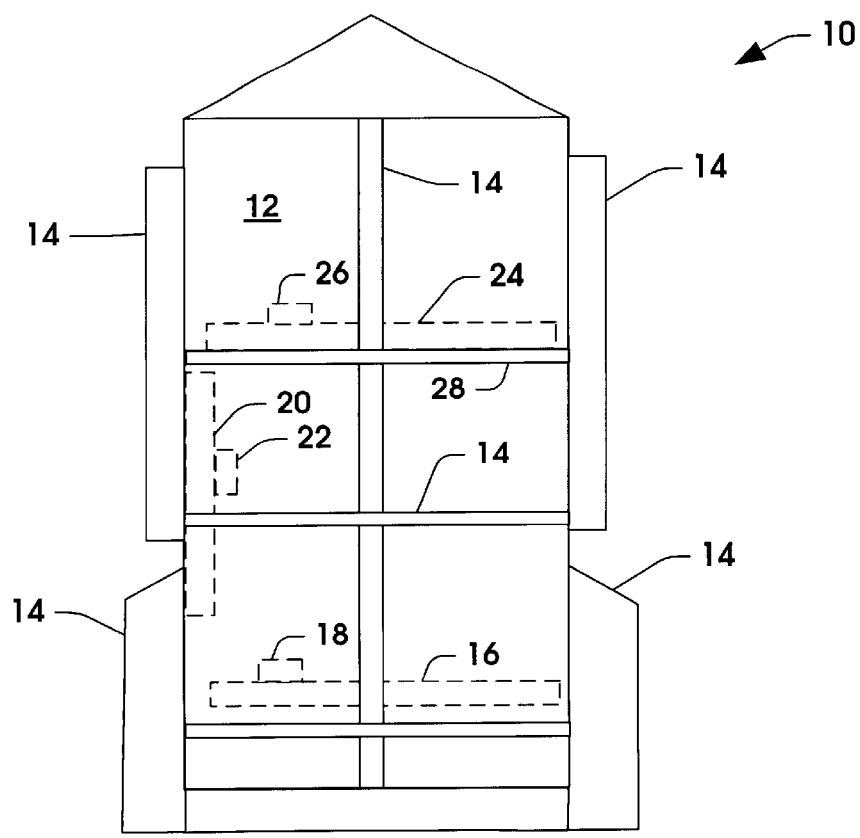
FIG. 1 illustrates a spacecraft that includes a plurality of heat pipe structures in accordance with an aspect of the present invention.

The present invention relates to an improved lightweight heat pipe structure for removing heat generated by one or more operating devices within a spacecraft. The heat pipe assembly employs lightweight components having similar, low CTE (i.e., less than 7.2 parts-per-million per degrees Kelvin (PPM/K)) with a high thermal conductivity interface. The heat pipe assembly includes a heat pipe formed from a low expansion metal alloy (e.g., iron-nickel based alloy) that is coupled to radiator panel face sheets or face skins via a saddle assembly. The saddle assembly is comprised of a lightweight (i.e., less than 2 grams per cubic centimeter ($g/cm^3$)), high thermal conductivity (i.e. equal to or greater than 220 watts per meter-degrees-Kelvin (W/mK)), low CTE material (i.e., less than 7.2 PPM/K), such as carbon-carbon. The metal alloy heat pipe and joining interfaces of the saddle are plated (e.g., nickel, copper), by an electro-plating process. The plated metal alloy heat pipe and the joining interfaces of the saddle can then be coupled by solder.

The standard saddle/heat pipe design utilizes an adhesive joint at the interface. Polymer based adhesives are inherently poor thermal conductors, thus blocking the efficient heat transfer from the heat source down through the high conductivity saddle and into the heat pipe. Solder alloys offer a 50 times improvement in thermal conductivity properties compared to conventional "high conductivity" adhesives. In addition, a solder joint provides a robust mechanical interface that offers improved thermal transfer, which increases performance and efficiency of the heat pipe assembly.

Employing low thermal expansion materials eliminates the CTE variance and provides no structural design limitations or compromises. Additionally, by soldering the interface joint between the saddles and heat pipes, a significant increase in thermal performance is realized across this interface compared to adhesive bonding. This attribute makes this soldered heat pipe design thermally comparable to the baseline aluminum design. A lightweight heat pipe assembly can be constructed that meets the thermal transfer requirements of a heat pipe radiator panel.

In one aspect of the invention, a carbon-carbon saddle material is prepared by electro-plating a thin (~0.002 inch) layer of nickel onto the joining surface. The nickel layer provides a compatible metallic surface for the solder alloy to adhere to the carbon-carbon saddle. Upon the subsequent soldering operation, as the solder flows and solidifies, it provides a mechanical lock between the saddle and the heat pipe. The solder material also provides a much higher thermal conductivity media between the two substrates, thus, providing better heat transfer across the interface than conventional adhesive bonding.

The near-zero coefficient of thermal expansion of the configuration allows the heat pipe assembly to be embedded within the graphite composite radiating panel skins or sheets without the formation of thermal stresses. Soldering the carbon-carbon saddle to the low expansion alloy heat pipe provides a much higher thermal conductivity material at the interface, and the interface will be stronger and more robust than conventional adhesive bonding. The solder joint provides over a 50 times improvement in thermal transfer across this interface compared to a conventional, high conductivity adhesive. By providing a higher thermal transfer coefficient from the carbon-carbon to the low expansion alloy heat pipe, thermal efficiency and overall performance is facilitated.

FIG. 1 illustrates a spacecraft 10 (e.g., a satellite) that includes a plurality of heat pipe structures. The spacecraft 10 includes a body housing 12 and a plurality of guidance fins 14 and 28 that facilitate steering and guidance of the spacecraft 10 during flight. A first heat pipe structure 16 resides in a lower portion of the body housing 12. At least one heat generating device 18 (e.g., electronic device) is mounted to one side of a host structure (e.g., radiator panel) of the first heat pipe structure 16. The first heat pipe structure 16 is operative to distribute heat generated by the at least one heat generating device 18 across the host structure, so that the at least one heat generating device 18 remains within a desired operating temperature range. The heat generated by the at least one heat generating device 18 conducts to at least one heat pipe associated with the first heat pipe structure 16. The conducted heat causes a working fluid (e.g., ammonia) to vaporize at an evaporating end of the heat pipe. The working fluid is then condensed and the heat of the condensation transferred through a convection end of the heat pipe. The heat is then convected to the host structure through the convection end of the heat pipe.

A second heat pipe structure 20 resides along a sidewall of the body housing 12. At least one heat generating device 22 is mounted to one side of a host structure (e.g., radiator panel) of the second heat pipe structure 20. The second side of the host structure is mounted to a sidewall of the body housing 12. The second heat pipe structure 20 is operative to distribute heat across the host structure that is dissipated into ambient space through the body housing 12. A third heat pipe structure 24 is mounted to the fin assembly 28 that extends through and around the body housing 12. At least one heat generating device 26 is mounted to one side of a host structure of the third heat pipe structure 24. The third side of the host structure is mounted to the fin assembly 28. The third heat pipe structure 24 is operative to distribute heat across the host structure that is dissipated into ambient space through the fin assembly 28 that extends outside the body housing 12.

At least one of the first heat pipe structure 16, the second heat pipe structure 20 and the third heat pipe structure 24 includes one or more metal alloy heat pipes (e.g., formed from an iron-nickel based alloy) soldered to saddle mounts residing within a host structure, such that the alloy heat pipes and the saddle mounts are fabricated from materials having similar, low CTE (i.e., less than 7.2 PPM/K). Additionally, the soldering interface provides high thermal conductivity for the heat pipe structure. It is to be appreciated that a single heat pipe structure or a plurality of heat pipe structures can reside within the body housing by a variety of different mounting configurations. In the example of FIG. 1, the first heat pipe structure 16 is an isothermally controlled structure, while the second and third heat pipe structures 20 and 24 are deployable radiators such that the heat is dissipated into space.

Figure 2:
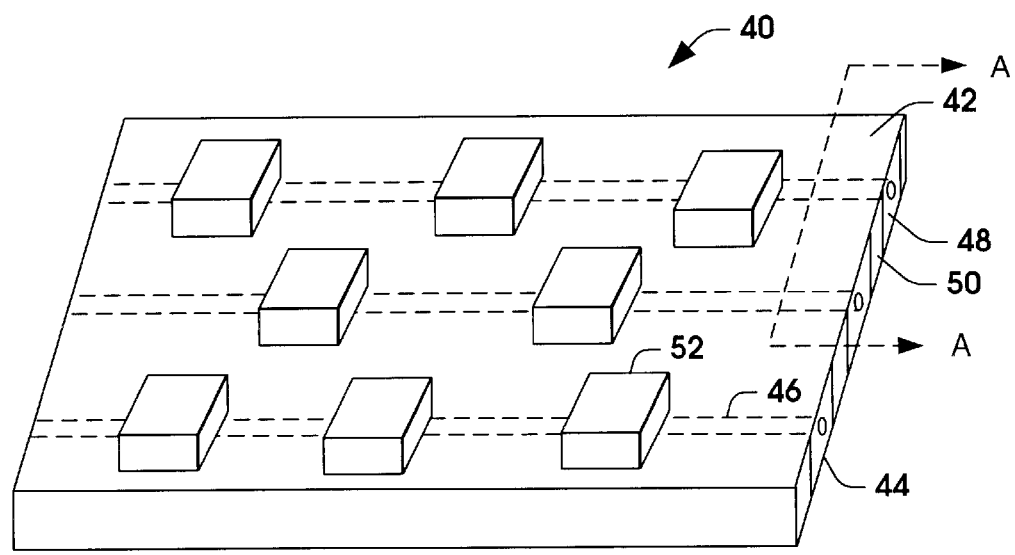
FIG. 2 illustrates a perspective view of a portion of a heat pipe structure in accordance with an aspect of the present invention.

FIG. 2 illustrates a perspective view of a portion of a heat pipe structure 40 in accordance with an aspect of the present invention. The heat pipe structure 40 includes a plurality of metal alloy heat pipe tubes 46 extending longitudinally through the heat pipe structure 40. The plurality of heat pipe tubes 46 are disposed within associated saddle assemblies 48 separated by a core 50. The saddle assemblies reside between a top radiating panel skin 42 and a bottom radiating panel skin 44. A plurality of operating devices 52 (e.g., electronic components) are affixed to the top radiating panel skin 42. The saddle assemblies 48 can extend the entire length of the heat pipes 46 or be comprised of individual blocks in a spaced apart relationship. The heat pipes 46 reside underneath the operating devices 52 and are operative to conduct heat from the operating devices 52. A working fluid (e.g., ammonia) within the heat tubes vaporizes from the heat of the operating devices 52 and convects the heat to an end (not shown) away from the operating devices 52. The heat can also be distributed across the top and bottom radiating panel skins 42 and 44, so that the operating devices 52 remain within an acceptable operating temperature range.

Figure 3:
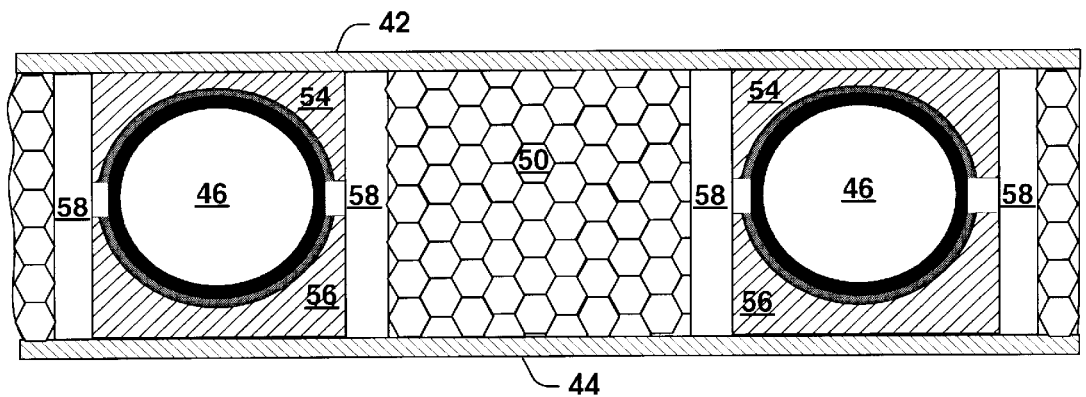
FIG. 3 illustrates a cross-sectional view of the heat pipe structure of FIG. 2 taken along lines A—A.

FIG. 3 illustrates a cross-sectional view of the host structure of FIG. 2 taken along lines A—A. The core 50 is formed of honeycomb material that separates the heat pipes from one another by a predetermined distance. The honeycomb can be formed from small sheets of aluminum (e.g., 1/1000 inch thick). Each heat pipe 46 is formed from a low CTE metal alloy, such as INVAR 36. INVAR 36 is an iron-nickel alloy which has a rate of thermal expansion approximately one-tenth that of carbon steel at temperatures up to 400° F. (204° C.). INVAR 36 is approximately 36% nickel with the balance being iron or steel. INVAR is trademarked by STE. AME. DE COMMENTRY FOUR-CHAMBAULT ET DECAZEVILLE CORPORATION of France. INVAR has a CTE of about 0.9 PPM/K to about 3.6 PPM/K. Alternatively, the metal alloy can be KOVAR a nickel-iron alloy with blends of copper and tungsten (Cu—W) or copper and molybdenum (Cu—Mo). KOVAR is a trademark of WESTINGHOUSE ELECTRIC & MANUFACTURING COMPANY. The metal alloy heat pipe is plated with nickel or copper and soldered to a top saddle portion 54 and a bottom saddle portion 56 of the saddle assembly 48. The top saddle portion 54 and the bottom saddle portion 56 are comprised of a low CTE graphite, such as carbon-carbon or carbon-foam. Carbon-carbon has a CTE of about 1.0 PPM/K and a thermal conductivity of up to 400 W/mK.

The joining interfaces of the top saddle portion 54 and the bottom saddle portion 56 are formed of semi-cylindrical recesses that mate with the cylindrical shape of the heat pipes 46. The joining interfaces are also nickel plated to facilitate soldering of the top and bottom saddle portions 54 and 56 to the heat pipe 46. The top saddle portion 54 and bottom saddle portion 56 are fixed to the top radiating panel skin 42 and the bottom radiator panel skin 44, respectively, employing adhesive. The top and bottom radiating panel skins 42 and 44 can be comprised of graphite composite facesheets that possess a similar low CTE as the heat pipe 46 and the saddle assembly 48, thus, forming an embedded heat pipe radiator panel with low thermal expansion characteristics for overall dimensional stability and high thermal dissipation capabilities. Alternatively, the top and bottom radiator panel skins 42 and 44 can be formed from beryllium and carbon-carbon or other forms of graphite. Separating walls 58 isolate the heat pipes 46 and saddle portions 48 from the core 50.

Figure 4:
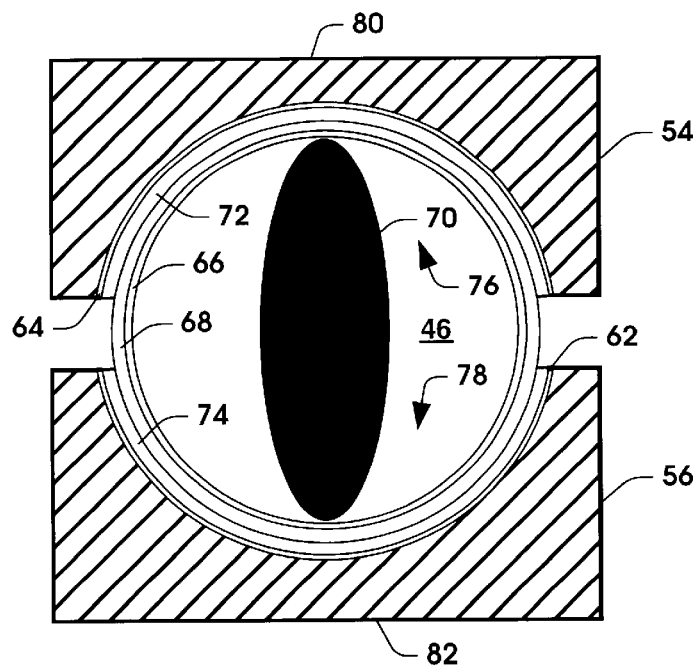
FIG. 4 illustrates a cross-sectional view of a heat pipe assembly in accordance with an aspect of the present invention.

FIG. 4 illustrates a cross-sectional view of a heat pipe assembly in accordance with an aspect of the present invention. The heat pipe assembly includes a wick 70 extending through the center of the heat pipe 46. The heat pipe 46 includes an outer wall 66 that extends around the circumference of the heat pipe 46. A plating layer 68 surrounds the outer wall 66 of the heat pipe 46. It is to be appreciated that the plating layer 68 only needs to cover areas that interface to the top saddle portion 54 and the bottom saddle portion 56. The top saddle portion 54 includes a first side with a concave semi-cylindrical recess portion 76 that provides a joining surface that mates with at least a portion of the circumference of the heat pipe 46, and a second side that has a generally planar surface 80 that provides a joining surface for mating to a radiating panel skin. The bottom saddle portion 56 includes a first side with a concave semi-cylindrical recess portion 78 that provides a joining surface that mates with at least a portion of the circumference of the heat pipe 46, and a second side that has a generally planar surface 82 that provides a joining surface for mating to a radiating panel skin.

The concave semi-cylindrical recess portion 76 of the top saddle portion 54 includes a plating layer 64 and the concave semi-cylindrical recess portion 78 of the bottom saddle portion 56 includes a plating layer 62. The plating layers 62, 64 and 68 facilitate soldering of the heat pipe to the top saddle portion 54 and the bottom saddle portion 56. The plating layers 62, 64 and 68 can be formed from a plating material such as nickel or copper. A soldering layer 72 couples the top saddle portion 54 to the heat pipe 46 and a soldering layer 74 couples the bottom saddle portion 56 to the heat pipe 46. The soldering layers 72 and 74 can be solder plated to the heat pipes 46 and/or joining surfaces of the top and bottom saddle portions 54 and 56, and the heat pipe assembly heated in an oven to bond the heat pipes 46 to the top and bottom saddle portions. Alternatively, the heat pipe 46 can be soldered to the joining surfaces of the top and bottom saddle portions 54 and 56 by hand or other common processes.

Figure 5:
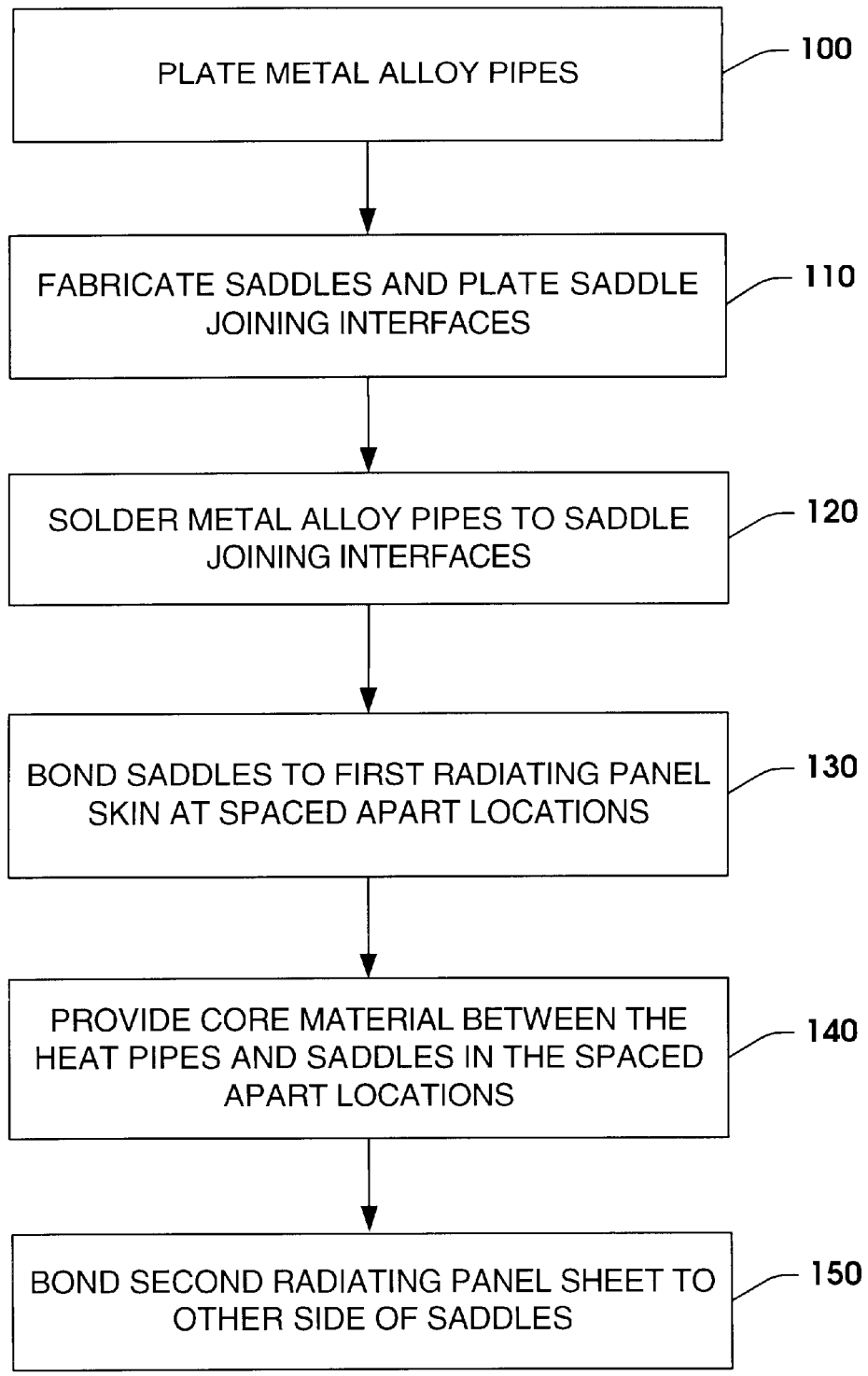
FIG. 5 illustrates a methodology for fabricating a heat pipe structure in accordance with an aspect of the present invention.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a methodology for fabricating a heat pipe structure in accordance with an aspect of the present invention. The methodology begins at 100 where metal alloy pipes are plated, for example, by employing a plating process. The metal alloy pipes can be fabricated from an iron-nickel alloy metal such as INVAR or KOVAR having high temperature capability and a low CTE. The metal alloy pipes can be plated with nickel and/or copper to facilitate soldering. At 110, saddle portions are fabricated and the joining surfaces are plated, for example, employing nickel electro-plating. The saddles can be formed of a composite graphite having a low CTE, such as carbon-carbon. The saddle joining interfaces are formed of a semi-cylindrical recess portion that mates with at least a portion of the circumference of the metal alloy pipe. The recess portions are plated to facilitate soldering of the saddle joining interfaces to the metal alloy pipes. At 120, the metal alloy pipes and the saddle joining interfaces are then soldered by plating at least one of the metal alloy pipes and the saddle joining interfaces with a solder layer, and baking in an oven to bond the saddle joining interfaces and metal alloy pipes. A variety of different soldering techniques can be employed to couple the metal alloy pipes to the saddle joining interfaces. The methodology then proceeds to 130.

At 130, the saddles are bonded to a first radiating panel face skin or face sheet at space apart locations. The saddles can be bonded to the first radiating panel skin by an epoxy resin. At 140, a core material is provided between the heat pipes and saddles in the space apart location to separate the heat pipes and saddles. Alternatively, the core material can be placed in the space apart locations prior to the saddles being bonded to the first radiating panel skin. The core material can be a honeycomb configuration of aluminum sheets bonded to the first radiating panel skin employing an epoxy. At 150, a second radiating panel skin is bonded to the other side of the saddles via an epoxy to complete the construction of the heat pipe structure.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A heat pipe structure for operating device in a spacecraft, the heat pipe structure comprising:
    a plurality of metal alloy heat pipes extending a longitudinal length of a host structure at spaced apart locations, the plurality of metal alloy heat pipes having a plating layer;
    a top saddle portion corresponding to each of the plurality of metal alloy heat pipes, the top saddle having a semi-cylindrical recess that forms a joining surface on a first side, the joining surface having a plating layer soldered to at least a portion of a circumference of the metal alloy pipe and a generally planar surface on a second side;
    a bottom saddle portion corresponding to each of the plurality of metal alloy heat pipes, the bottom saddle portion having a semi-cylindrical recess that forms a joining surface on a first side, the joining surface having a plating layer soldered to at least a portion of a circumference of the metal alloy heat pipe and a generally planar surface on a second side;
    a top radiating panel skin coupled to the generally planar surfaces of the top saddle portions; and
    a bottom radiating panel skin coupled to the generally planar surfaces of the bottom saddle portions, the metal alloy heat pipes, the top saddle portions and the bottom saddle portions having similar, low coefficients of thermal expansion (CTE).

2. The heat pipe structure of claim 1, the plurality of metal alloy heat pipes being formed of an iron-nickel based alloy.

3. The heat pipe structure of claim 2, the iron-nickel based alloy having a CTE of about 0.9 parts-per-million per degrees Kelvin (PPM/K) to about 3.6 PPM/K.

4. The heat pipe structure of claim 1, the top saddle portions and the bottom saddle portions being formed from a carbon-carbon material.

5. The heat pipe structure of claim 1, the plating layers being formed from at least one of nickel and copper.

6. A heat pipe structure for cooling heat generating devices in a spacecraft, the heat pipe structure comprising:
    a metal alloy heat pipe extending a longitudinal length of a host structure;
    a top saddle portion having a joining surface on a first side coupled to at least a portion of a circumference of the metal alloy heat pipe and a generally planar surface on a second side;
    a bottom saddle portion having a joining surface on a first side coupled to at least a portion of a circumference of the metal alloy heat pipe and a generally planar surface on a second side; and
    a top radiating panel sheet coupled to the generally planar surface of the bottom saddle portion, the metal alloy heat pipe, the top saddle portion and the bottom saddle portion having similar, low coefficient of thermal expansion (CTE).

7. The heat pipe structure of claim 6, the joining surface of the top saddle portion and the joining surface of the bottom saddle portion are soldered to the metal alloy heat pipe, the solder providing a high thermal conductivity interface.

8. The heat pipe structure of claim 6, the metal alloy heat pipe being formed of an iron-nickel based alloy.

9. The heat pipe structure of claim 8, the iron-nickel based alloy having a CTE of about 0.9 parts-per-million per degrees Kelvin (PPM/K) to about 3.6 PPM/K.

10. The heat pipe structure of claim 6, the top saddle portion and the bottom saddle portion being formed from a carbon-carbon material.

11. The heat pipe structure of claim 6, the joining surface of the top saddle portion and the bottom saddle portion being plated and the metal alloy heat pipe being plated with a plating material layer.

12. The heat pipe structure of claim 11, the plating material layer being at least one of nickel and copper.

13. The heat pipe structure of claim 6, the top radiating panel sheet and the bottom radiating panel sheet are formed from a composite material having a low CTE.

14. The heat pipe structure of claim 6, further comprising a plurality of metal alloy heat pipes coupled between corresponding top and bottom saddle portions to form a plurality of heat pipe assemblies, the plurality of heat pipe assemblies being disposed at spaced apart locations within the heat pipe structure and separated by a core material.

15. A space craft comprising the heat pipe structure of claim 6.

16. A heat pipe structure for cooling heat generating devices in a spacecraft, the heat pipe structure comprising:
    a heat pipe extending a longitudinal length of a host structure;

a saddle portion having a joining surface coupled to at least a portion of a circumference of the heat pipe by a contact material that provides a high thermal conductivity interface;

a top radiating panel coupled to the saddle on a first side; and a bottom radiating panel coupled to a second side of the saddle.

17. The heat pipe structure of claim 16, the contact material having a thermal conductivity that is ≦220 watts per meter-degrees-Kelvin (w/mK).

18. The heat pipe structure of claim 16, the joining surface of the saddle portion is soldered to the heat pipe, the solder providing a high thermal conductivity interface.

19. The heat pipe structure of claim 16, the heat pipe being formed of an iron-nickel based alloy.

20. The heat pipe structure of claim 16, the saddle portion being formed from a carbon-carbon material.

21. The heat pipe structure of claim 16, the joining surface of the saddle portion being plated and the heat pipe being plated with a plating material layer.

22. A method for forming a heat pipe structure for cooling operating devices in a spacecraft, the method comprising:

plating a metal alloy heat pipe having a low coefficient of thermal expansion (CTE);

forming a top saddle portion having a semi-cylindrical recess that forms a joining surface on a first side that mates with at least a portion of a circumference of the metal alloy pipe and a generally planar surface on a second side;

forming a bottom saddle portion having a semi-cylindrical recess that forms a joining surface on a first side that mates with at least a portion of a circumference of the metal alloy heat pipe and a generally planar surface on a second side, the top saddle portion and the bottom saddle portion being formed from a material having a similar CTE as the metal alloy heat pipe;

plating the joining surfaces of the top saddle portion and the bottom saddle portion;

soldering the joining surfaces of the top saddle portion and the bottom saddle portion to the metal alloy heat pipe;

coupling a top radiating panel skin to the generally planar surfaces of the top saddle portion; and coupling a bottom radiating panel skin to the generally planar surfaces of the bottom saddle portion.

23. The method of claim 22, further comprising plating a plurality of metal alloy heat pipes coupled between corresponding top and bottom saddle portions to form a plurality of heat pipe assemblies, and disposing the plurality of heat pipe assemblies at spaced apart locations within the heat pipe structure and separated by a core material.

24. The method of claim 23, the plurality of metal alloy heat pipes being formed of an iron-nickel based alloy and the top saddle portions and the bottom saddle portions being formed from a carbon-carbon material.

25. The method of claim 24, iron-nickel based alloy having a CTE of about 9 parts-per-million per degrees Kelvin (PPM/K) to about 3.6 PPM/K.

26. The method of claim 22, the plating of the metal alloy heat pipe and the joining interfaces comprising plating a layer of at least one of nickel and copper onto the metal alloy heat pipe and the joining interfaces of the top saddle portion and the bottom saddle portion.

* * * * *